(12) United States Patent
Thubert et al.

(10) Patent No.: US 7,149,225 B2
(45) Date of Patent: Dec. 12, 2006

(54) ARRANGEMENT FOR TRAVERSING AN IPV4 NETWORK BY IPV6 MOBILE NODES VIA A MOBILITY ANCHOR POINT

(75) Inventors: Pascal Thubert, La Colle sur Loup (FR); Marco Molteni, Antibes (FR); Patrick Wetterwald, Cagnes sur Mer (FR); Ole Troan, Redhill (GB)

(73) Assignee: Cisco Technology, Inc., San Jose, CA (US)

( * ) Notice: Subject to any disclaimer, the term of this patent is extended or adjusted under 35 U.S.C. 154(b) by 507 days.

(21) Appl. No.: 10/617,197

(22) Filed: Jul. 11, 2003

(65) Prior Publication Data

US 2004/0179508 A1 Sep. 16, 2004

Related U.S. Application Data

(63) Continuation-in-part of application No. 10/383,567, filed on Mar. 10, 2003, now Pat. No. 7,031,328.

(51) Int. Cl.
*H04L 12/28* (2006.01)
(52) U.S. Cl. ........................ 370/401; 370/466
(58) Field of Classification Search ............... None
See application file for complete search history.

(56) References Cited

U.S. PATENT DOCUMENTS 6,496,505 B1 * 12/2002 La Porta et al. ............ 370/392
6,721,197 B1 *  4/2004 McCollum ................... 365/96
6,947,401 B1 *  9/2005 El-Malki et al. ............ 370/331
2003/0018810 A1 *  1/2003 Karagiannis et al. ....... 709/238

OTHER PUBLICATIONS

Johnson et al., "Mobility Support in IPv6", Internet Draft, IETF Mobile IP Working Group, draft-ietf-mobileip-ipv6-20.txt, Jan. 20, 2003.
Deering et al., "Internet Protocol, Version 6 (IPv6)", Request for Comments: 2460, IETF Network Working Group, Specification, Dec. 1998.
Huitema, "Teredo: Tunneling IPv6 over UDP through NAT's", IETF Internet Draft, draft-ietf-ngtrans-shipworm-08.txt, Sep. 17, 2002.

(Continued)

*Primary Examiner*—Frank Duong
(74) *Attorney, Agent, or Firm*—Leon R. Turkevich

(57) ABSTRACT

An IPv6 mobile node establishes an IPv4 connection with an IPv6 router having an IPv4 interface and configured as a Mobility Anchor Point (MAP) according to Hierarchical Mobile IPv6 Protocol. The MAP assigns a valid IPv6 care-of address to the IPv6 mobile node in response to receiving an IPv4 packet carrying an IPv6 packet requesting a valid care-of address. The IPv4 packet includes IPv4 source and destination addresses, a TCP/UDP source port and TCP/UDP destination port, and a synthetic tag address in the IPv6 source address field. The synthetic tag address includes a unique identifier that enables the MAP to associate the valid IPv6 care-of address with the IPv6 mobile node. Hence, the MAP forwards an IPv6 packet, carried via the IPv4 connection from the source IPv6 mobile node, onto an IPv6 network with an IPv6 source address field that specifies the assigned valid IPv6 care-of address.

45 Claims, 9 Drawing Sheets

OTHER PUBLICATIONS

Carpenter et al., "Connection of IPv6 Domains via IPv4 Clouds", IETF Network Working Group, Request for Comments: 3056, Feb. 2001.

Thubert et al., "IPv6 Reverse Routing Header and its application to Mobile Networks", IETF Network Working Group, Internet-Draft, draft-thubert-nemo-reverse-routing-header-01, Oct. 11, 2002.

Thubert et al., "IPv6 Reverse Routing Header and its application to Mobile Networks", IETF Network Working Group, Internet-Draft, draft-thubert-nemo-reverse-.

Soliman et al., Hierarchical MIPv6 mobility management (HMIPv6), IETF Mobile IP Working Group, Internet-Draft, draft-ietf-mobileip-hmipv6-06.txt, Jul. 2002.

* cited by examiner

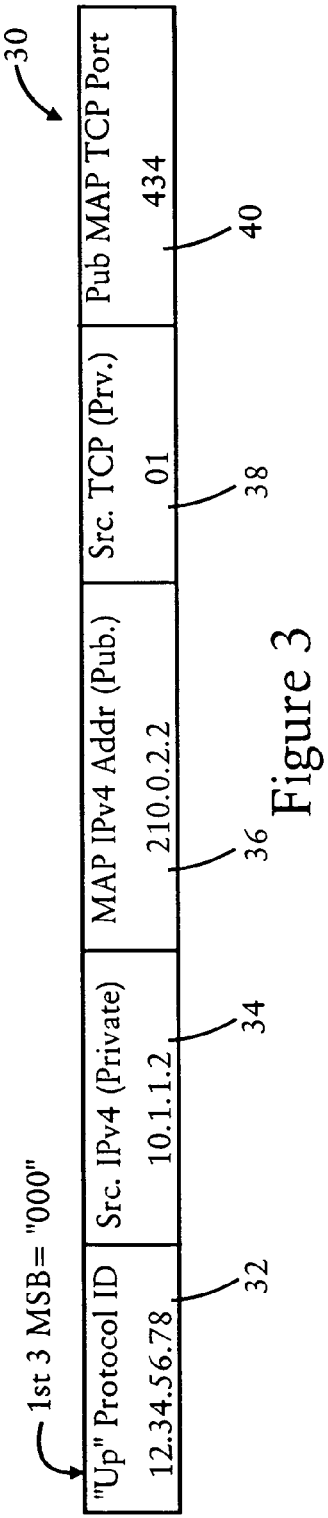
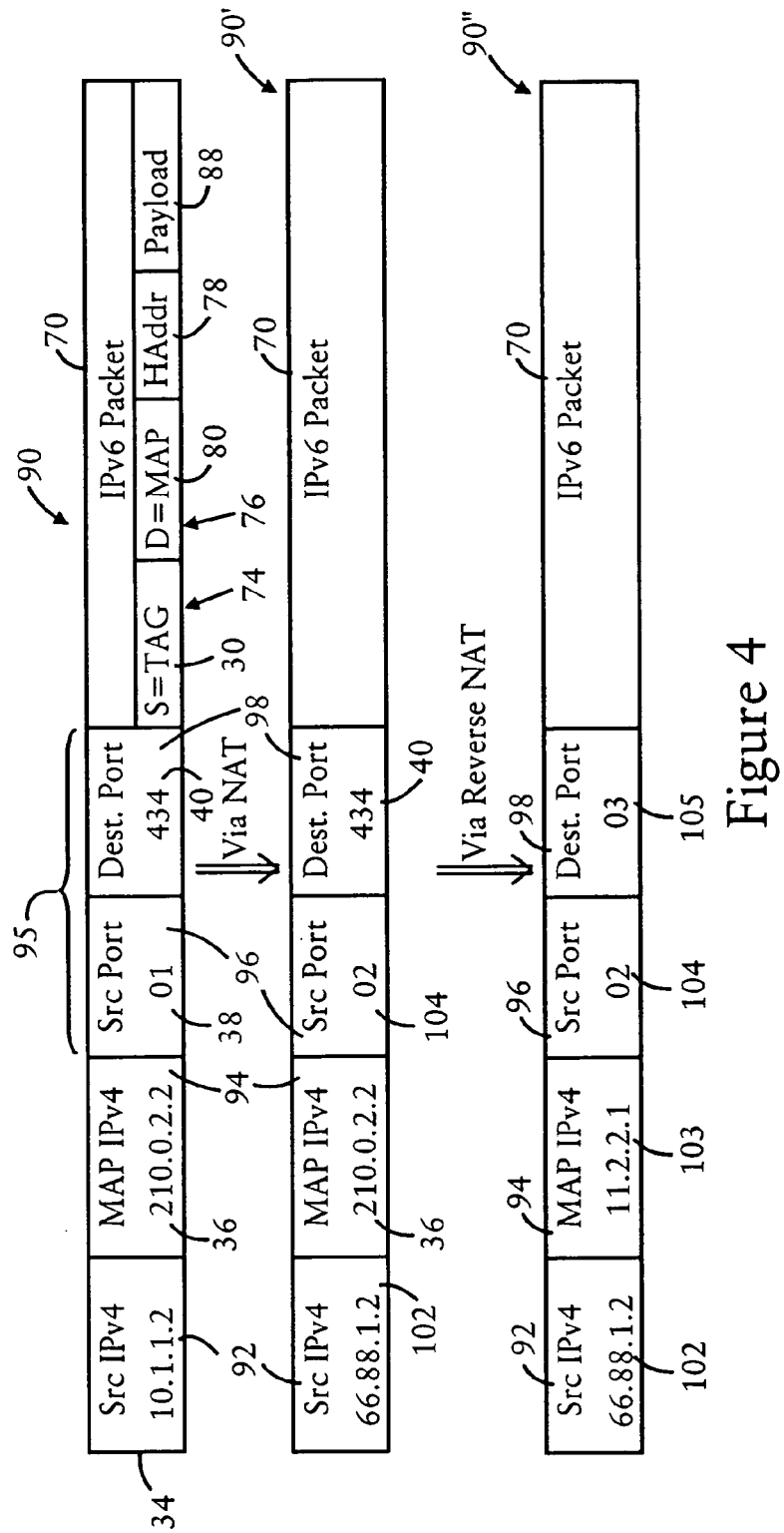
Figure 3
Figure 4

ARRANGEMENT FOR TRAVERSING AN IPV4 NETWORK BY IPV6 MOBILE NODES VIA A MOBILITY ANCHOR POINT

CROSS REFERENCE TO RELATED APPLICATIONS

This application is a continuation-in-part of commonly-assigned application Ser. No. 10/383,567, filed Mar. 10, 2003, the disclosure of which is incorporated in its entirety herein by reference.

BACKGROUND OF THE INVENTION

1. Field of the Invention

The present invention relates to transport of Internet Protocol Version 6 (IPv6) packets by IPv6 nodes via an IPv4 network having a Network Address Translator (NAT) or a Port Address Translator (PAT).

2. Description of the Related Art

Proposals have been made by Internet Engineering Task Force (IETF) groups for improved mobility support of Internet Protocol (IP) based mobile devices (e.g., laptops, IP phones, personal digital assistants, etc.) in an effort to provide continuous Internet Protocol (IP) based connectivity. The IETF has two working groups focusing on mobile networks, a Mobile Ad-hoc Networks (MANET) Working Group that is working to develop standardized MANET routing specification(s) for adoption by the IETF, and NEMO (mobile networks). NEMO uses Mobile IP (MIP) to provide connectivity between mobile networks and the infrastructure (e.g.,, the Internet). The key component in NEMO is a mobile router that handles MIP on behalf of the mobile networks that it serves.

A "Mobile IPv6" protocol is disclosed in an Internet Draft by Johnson et al., entitled "Mobility Support in IPv6", available on the World Wide Web at the IETF website address "ietf.org/internet-drafts/draft-ietf-mobileip-ipv6-21 .txt" (the disclosure of which is incorporated in its entirety herein by reference). According to Johnson et al., the Mobile IPv6 protocol enables a mobile node to move from one link to another without changing the mobile node's IP address. In particular, the mobile node is assigned a "home address". The "home address" is an IP address assigned to the mobile node within its home subnet prefix on its home link. While a mobile node is at home, packets addressed to its home address are routed to the mobile node's home link, using conventional Internet routing mechanisms.

The mobile node also is assigned a home agent for registering any care-of address used by the mobile node at its point of attachment to the Internet while the mobile node is away from its home link. A care-of address is an IP address associated with a mobile node that has the subnet prefix of a particular link away from its home link (i.e., a foreign link). A home agent is a router on a mobile node's home link with which the mobile node has registered its current care-of address. While the mobile node is away from its home link, the home agent intercepts packets on the home link destined to the mobile node's home address; the home agent encapsulates the packets, and tunnels the packets to the mobile node's registered care-of address.

A variation of the Mobile IPv6 protocol is disclosed in an IETF Internet Draft by Soliman et al., "Hierarchical Mobile IPv6 mobility management (HMIPv6)" October 2002, available on the World Wide Web at the IETF website address "ietf.org/internet-drafts/draft-ietf-mobileip-hmipv6-07 .txt" and incorporated in its entirety herein by reference. The Internet Draft by Soliman et al. discloses a Mobility Anchor Point (MAP) within an IPv6 network that implements HMIPv6 by assigning a regional care-of address to mobile nodes within its address realm. Mobile nodes may thus use on-link care-of addresses for communications within the address realm of the MAP, and the regional care-of address for IPv6 communications outside the MAP address realm. As such, the MAP serves as a local home agent.

Hence, a mobile node is always addressable by its "home address": packets may be routed to the mobile node using this address regardless of the mobile node's current point of attachment to the Internet. The mobile node also may continue to communicate with other nodes (stationary or mobile) after moving to a new link. The movement of a mobile node away from its home link is thus transparent to transport and higher-layer protocols and applications.

Proposals are underway by the Next Generation Transition (NGTRANS) Working Group of the Internet Engineering Task Force (IETF) to enable network nodes to transmit IP packets, generated according to IPv6 protocol as specified by the Request for Comments (RFC) 2460, across an IPv4 network. In particular, RFC 3056 proposes an interim solution (referred to herein as "the 6 to 4 proposal") of sending IPv6 packets as payload for IPv4 packets, where an interim unique IPv6 address prefix is assigned to any node that has at least one globally unique IPv4 address. These RFCs are available at the IETF website on the World Wide Web at "ietf.org" and these RFCs 2460 and 3056 are incorporated in their entirety herein by reference.

The 6to4 proposal specifies that an IPv6 node has an IPv6 address that contains an assigned IPv4 address, resulting in an automatic mapping between the IPv6 and IPv4 addresses. Hence, the IPv6 node can easily encapsulate the IPv6 packet with an IPv4 header based on extracting the assigned IPv4 address from within its IPv6 address. In particular, RFC 3056 specifies that the Internet Assigned Numbers Authority (IANA) has permanently assigned one 13-bit IPv6 Top Level Aggregator (TLA) identifier under the IPv6 Format Prefix "001" for the 6to4 proposal: the numeric value of the TLA is 0x00002, i.e., it has a value of 2002::/16 when expressed as a 16-bit IPv6 address prefix. Hence, a 48-bit address prefix is created by the format prefix "001", followed by the 13-bit TLA "0x00002", followed by the assigned 32-bit IPv4 address; the remaining 80 bits of the 128-bit IPv6 address are available for a 16-bit Site-Level Aggregation Identifier (SLA ID), and a 64-bit Interface ID. Consequently, any node having at least one globally unique IPv4 address can have a globally unique IPv6 address, even if the node is combined with an IPv4 Network Address Translator (NAT).

Concerns arise in the event that an IPv6 node is coupled to a private IPv4 network having a Network Address Translator (NAT). NATs perform a Layer-3 translation of IP-Addresses, so that public Internet addresses map to private IP addresses, as described in detail by the Request for Comments 1918 (RFC 1918). This mapping has allowed enterprises to map a large number of private addresses to a limited number of public addresses, thus limiting the number of public addresses required by Internet users.

As described in RFC 3056, however, if an IPv6 node is coupled to an IPv4 network having a NAT, then the NAT box "must also contain a fully functional IPv6 router including the 6to4 mechanism" in order for the 6to4 proposal to still be operable in the IPv4 network having the NAT. However, the modification of existing NATs to include IPv6 routers to include the 6to4 mechanism may not be a practical solution.

Further, the IPv4 addresses of the 6to 4 protocol are assumed to be global public addresses. Hence, if an IPv6 node (i.e., a correspondent node) wants to communicate with a roaming mobile IPv6 node, the 6to4 address of the roaming mobile IPv6 node must be a global public address, not a private address.

One proposal for traversing a NAT by an IPv6 node using automatic tunneling is described in an IETF Draft by Huitema, entitled "Teredo: Tunneling IPv6 over UDP through NATs", Sep. 17, 2002, available on the World Wide Web at the IETF website address "ietf.org/internet-drafts/draft-ietf-ngtrans-shipworm-08.txt"

Huitema suggests that IPv6 nodes located behind NATs can access "Teredo servers" and "Teredo relays" to learn their "global address" and to obtain connectivity, where clients, servers, and relays can be organized in "Teredo networks". Huitema relies on a complex client server-based interaction between the client (i.e., the IPv6 node) behind the NAT in the private IPv4 address realm, and the Teredo server and Teredo relay on the opposite side of the NAT in the public IPv4 address realm. Hence, the communications between the IPv6 node on the private side of the NAT, and the Teredo server and the Teredo relay on the public side of the NAT, (via the NAT), require that the IPv6 node has a specified path to both the Teredo server and the Teredo relay gateway on the public side; hence, the IPv6 node needs to use the same IPv4 identifier (e.g., UDP port IP address that is being translated by the NAT).

This same IPv4 identifier for communications with the Teredo server and Teredo relay, however, is impossible with symmetric NATs because the Teredo server and Teredo relay each have a distinct corresponding IPv4 public address. In particular, symmetric NATs index their address translation tables not only by private IP address/private UDP port/public IP address/ public UDP port of the packet output by a private IPv4 node, but also by the destination IP address and destination port specified by the packet and destined for the public IPv4 network. Hence, since the Teredo server and Teredo relay have distinct IP addresses, the symmetric NAT will not map the packets to the same private IP address/private UDP port used by the private IPv4 node. Hence, the Huitema solution cannot traverse a symmetric NAT.

SUMMARY OF THE INVENTION

There is a need for an arrangement that enables IPv6 nodes to communicate transparently across an IPv4 network, regardless of whether the IPv6 nodes are separated across the IPv4 network by a symmetrical NAT.

There also is a need for an arrangement that enables IPv6 nodes to transport IPv6 packets across an IPv4 network, without the necessity of each IPv6 node serving as an IPv4 endpoint to store state information.

There also is a need for an arrangement that enables IPv4 connections to be established across a NAT by IPv6 gateways in a manner that minimizes use of NAT resources.

These and other needs are attained by the present invention, where a source IPv6 mobile node is configured for establishing an IPv4 connection with a destination IPv6 router having an IPv4 interface and configured as a Mobility Anchor Point (MAP) according to Hierarchical Mobile IPv6 Protocol. The MAP is configured for assigning a valid IPv6 care-of address to the IPv6 mobile node in response to receiving an IPv4 packet carrying an IPv6 packet requesting a valid care-of address. The IPv4 packet includes IPv4 source and destination addresses, a transport layer source port and transport layer destination port, and a synthetic tag address in the IPv6 source address field. The synthetic tag address includes a unique identifier that enables the MAP to associate the valid IPv6 care-of address with the IPv6 mobile node. Hence, the MAP is configured for forwarding an IPv6 packet, carried via the IPv4 connection from the source IPv6 mobile node, onto an IPv6 network with an IPv6 source address field that specifies the assigned valid IPv6 care-of address. Hence, the MAP enables the IPv6 mobile node to send and receive IPv6 messages via an IPv4 network, regardless of whether the IPv4 network includes a NAT that separates the source and destination IPv6 mobile routers.

One aspect of the present invention provides a method in an IPv6 mobile node. The method includes first generating a tag that uniquely identifies the IPv6 mobile node to an IPv6 gateway. The IPv6 gateway has an IPv4 gateway address and an IPv6 gateway address, and is configured for transferring packets between an IPv4 network via the corresponding IPv4 gateway address and an IPv6 network. The method also includes second generating a first IPv6 packet that specifies a request for a valid IPv6 care-of address that is reachable in the IPv6 network via the IPv6 gateway, where the first IPv6 packet has an IPv6 source address field that specifies the tag and an IPv6 destination address field that specifies the IPv6 gateway address. The method also includes first encapsulating the first IPv6 packet in a first IPv4 packet having an IPv4 header including a destination address field that specifies the IPv4 gateway address, a source address field specifying a mobile node IPv4 address for the IPv6 mobile node, and a transport header having a source port field specifying a prescribed transport layer port for the IPv6 mobile node, and a destination port field specifying a prescribed transport layer port for the IPv6 gateway used for identifying transfer of the IPv6 packet between the IPv4 network and the IPv6 network. The first IPv4 packet is output carrying the first IPv6 packet to the IPv6 gateway via the IPv4 network. The method also includes receiving a second IPv4 packet carrying a second IPv6 packet that indicates an acknowledgement by the IPv6 gateway for the valid IPv6 care-of address. A third IPv6 packet is generated for a destination node reachable via the IPv6 network. The third IPv6 packet is encapsulated in a third IPv4 packet having the IPv4 header, and the third IPv4 packet is output onto the IPv4 network for transfer of the third IPv6 packet onto the IPv6 network by the IPv6 gateway.

Another aspect of the present invention provides a method in an IPv6 router. The method includes attaching to an IPv4 network using an IPv4 gateway address and an IPv6 network using an IPv6 address, and receiving from the IPv4 network a first IPv4 packet. The first IPv4 packet has a destination address field specifying the IPv4 gateway address, a destination port field specifying a prescribed transport layer gateway port, a source address field specifying an IPv4 address and a source port field specifying a second transport layer port. An IPv6 packet is recovered from the IPv4 packet in response to detecting the prescribed transport layer gateway port in the destination port field. The method also includes detecting within the IPv6 packet an IPv6 source address field that specifies an IPv6 tag address that uniquely identifies an IPv6 mobile node, and a request for a valid IPv6 care-of address that is reachable in the IPv6 network via the IPv6 router. The valid IPv6 care-of address is assigned in response to the request, and a second IPv4 packet is output via the IPv4 network. The second IPv4 packet carries a second IPv6 packet generated by the IPv6 router in response to the assigning step and that acknowledges the request for the valid IPv6 care-of address, the second IPv4 packet specifying the IPv4 address of the IPv6 mobile node in the corresponding destination address field and the second transport layer port in the corresponding destination port field.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed out in the appended claims.

BRIEF DESCRIPTION OF THE DRAWINGS

Reference is made to the attached drawings, wherein elements having the same reference numeral designations represent like elements throughout and wherein:

FIG. 3 is a diagram illustrating an IPv6 tag address generated by the IPv6 mobile host of FIG. 2A.

FIG. 4 is a diagram illustrating an IPv4 packet, output by the source mobile node of FIG. 1 and carrying an IPv6 packet, that encounters address translation by a NAT/PAT and a reverse NAT/PAT.

BEST MODE FOR CARRYING OUT THE INVENTION

The disclosed embodiment is an improvement of the arrangement disclosed in the above-incorporated parent application No. 10/383,567, filed Mar. 10, 2003 (hereinafter "parent application") directed to tunneling IPv6 packets across an IPv4 network based on use of IPv6 based reverse routing headers. The generation and use of reverse routing headers was published on Jun. 19, 2002 by the inventors as an Internet Draft, "IPv6 Reverse Routing Header and its application to Mobile Networks" available on the World Wide Web at the IETF website address "ietf.org/internet-drafts/draft-thubert-nemo-reverse-routing-header-00.txt" and is incorporated in its entirety herein by reference. A more recent version was published Oct. 11, 2002, available on the World Wide Web at the IETF website address "ietf.org/internet-drafts/draft-thubert-nemo-reverse-routing-header-01.txt" and incorporated in its entirety herein by reference.

The disclosed improvement eliminates the necessity of reverse routing headers by expanding on the use of Hierarchical Mobile IPv6 mobility management (HMIPv6), disclosed in the above-incorporated Internet Draft by Soliman et al.

The disclosed embodiment expands on the use of HMIPv6 to enable an IPv6 mobile node to transfer IPv6 packets across an IPv4 tunnel connection, based on generating unique identifiers as "local care-of addresses"; once the MAP assigns a valid IPv6 care-of address to an IPv6 mobile node and establishes an association between the valid IPv6 care-of address and the IPv4 tunnel connection and/or the unique identifier, the MAP can associate the IPv6 mobile node with its assigned valid IPv6 care-of address.

In addition, the MAP is able to store state information for a given IPv6 mobile node and its corresponding IPv4 tunnel connection. Hence, the state-aware MAP can establish IPv4 connections using state-dependent, connection-oriented protocols, such as TCP, Stream Control Transmission Protocol (SCTP), etc., as well as connectionless-oriented protocols such as UDP.

Hence, the IPv6 mobile node can roam throughout the IPv4 network serviced by the MAP without changing its care-of address, since the MAP is able to maintain state information about the identity, location, connection status, etc., of the IPv6 node.

Figure 1:
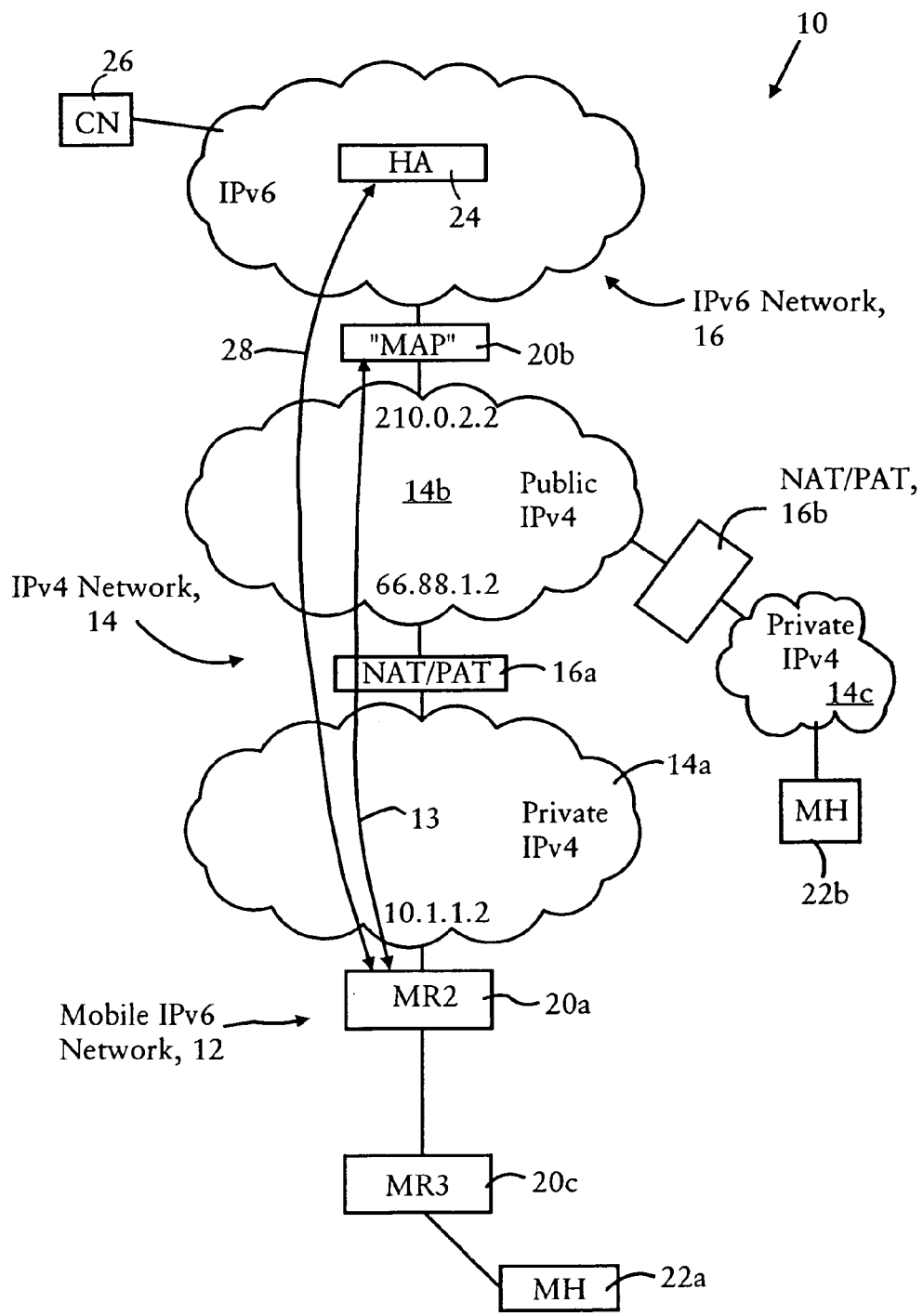
FIG. 1 is a diagram illustrating IPv6 mobile nodes establishing an IPv4 connection across an IPv4 network utilizing a network address translator (NAT), according to an embodiment of the present invention.

FIG. 1 is a diagram illustrating a network 10, where a mobile IPv6 network 12 is configured for establishing an IPv4 tunnel 13 across an Pv4 network 14 to a destination IPv6 network 16. In particular, the mobile network 12 includes at least a mobile router (MR) 20a configured for sending and receiving packets according to IPv6 protocol. The mobile router 20a also is configured for communications with a corresponding home agent (HA) 24 configured for forwarding packets, addressed to the mobile router home address, to the mobile router 20a's care of address (CoA), according to Mobile IP Protocol as described in an IETF Draft by Johnson et al., entitled "Mobility Support in IPv6", Jan.20, 2003, available on the World Wide Web at the IETF website address "ietf.ora/internet-drafts/draft-ietf-mobileip-ipv6-21.txt" (the disclosure of which is incorporated in its entirety herein by reference).

The mobile router 20a ("MR2") may roam as a single roaming mobile router, or may be the top-level mobile router (TLMR) of a mobile network 12 having attached IPv6 nodes. As illustrated in FIG. 1, the mobile router 20a serves as a TLMR in the mobile network 12 for a mobile router 20c ("MR3") and a mobile host (MH) 22a. The mobile network 12 also includes, for example, a single mobile host 22b that has a separate point of attachment, namely a private IPv4 network 14c coupled to the public IPv4 network 14b via the NAT/PAT 16b, for reaching an IPv6 router of the IPv6 network 16. As such, the description of the mobile router 20a regarding traversing an IPv4 network also applies to the mobile host 22b, and as such the references herein to the mobile router 20a, the mobile host 22b, and generally "mobile node" may be used interchangably.

The mobile router 20a is configured for establishing a bidirectional tunnel 28 with its corresponding home agent (HA) 24, enabling packets sent to the home address of the mobile router 20a (e.g., by a correspondent node (CN) 26) to be forwarded by the home agent 24 to the care-of address for the mobile router 20a.

Since the mobile node (e.g., mobile router 20a and/or the mobile host 22b) is attached to an IPv4 network 14, as opposed to an IPv6 router, the mobile node (e.g., source mobile router 20a and/or the mobile host 22b) is configured for establishing an IPv4 tunnel 13 (e.g., a TCP tunnel, UDP tunnel, or SCTP tunnel) with a corresponding IPv6 destination gateway 20b, also referred to as a Mobility Anchor Point (MAP), having a connection on the IPv4 network 14. Hence, the mobile router 20a and the mobile host 22b are configured for implementing respective bidirectional tunnel 28s with their respective home agents (assume for simplicity the same home agent 24) via respective IPv4 tunnels, using the IPv6 gateway 20b as an endpoint in the IPv4 tunnel 13.

The IPv4 network 14 may optionally include a Network Address Translator (NAT) and/or a Port Address Translator (PAT) 16a or 16b. As illustrated in FIG. 1, the mobile router 20a is attached to a private IPv4 network 14a and the mobile host 22b is attached to a private IPv4 network 14c: the mobile router 20a and the mobile host 22b may obtain their IPv4 addresses (e.g., "10.1.1.2" for MR2) based on a prior configuration (static or unnumbered), Dynamic Host Configuration Protocol (DHCP), or IP Control Protocol (IPCP) for Point-to-Point protocol (PPP) links. The private IPv4 network 14a and 14c have access to the respective network address translators (NAT) 16a and 16b having a Port Address Translator (PAT) to enable nodes in the private networks 14a and 14c to be addressable in the public IPv4 network 14b.

The mobile router 20a and the mobile host 22b also are configured to access the IPv6 gateway 20b at a predetermined IPv4 address (e.g., "210.0.2.2"), and a prescribed MAP port (e.g., TCP or UDP port "434") enabling the mobile router 20a and the mobile host 22b to establish the IPv4 tunnels (e.g., 13) with the IPv6 gateway 20b without the necessity of any discovery protocols. Note that the mobile router 20a and the mobile host 22b may be configured to store a plurality of MAP IPv4 addresses for multiple IPv6 gateways, in which case the mobile router 20a and the mobile host could be configured to locate an optimum IPv6 gateway.

As described above, a problem with establishing an IPv4 tunnel traversing the NAT/PAT 16 is that symmetric NATs 16 index their address translation tables not only by private IP address/private TCP or UDP port/ public IP address/ public TCP or UDP port of the packet being translated for a private IPv4 node (in this case the mobile router 20a), but also by the destination IP address and destination port for an ingress packet from the public IPv4 network to the IPv6 gateway 20b.

According to the disclosed embodiment, the mobile router 20a is configured for initiating a corresponding bidirectional IPv4 tunnel 13 using the same source/destination IPv4 address pair, ensuring that the IPv4 tunnel endpoints 20a and 20b remain the same. Since the endpoints remain the same, the bidirectional IPv4 tunnel 13 can be reliably maintained across the NAT 16 for multiple IPv6 data streams. The mobile host 22b creates the same type of bidirectional IPv4 tunnel using the corresponding source/destination IPv4 address pair.

Further, the mobile router 20a and the mobile host 22b each generate a synthetic tag address that uniquely identifies the corresponding node. As described below, the synthetic tag address is used as a local care-of address that includes all necessary IPv4 tunnel information to enable the IPv6 gateway 20b to uniquely identify the corresponding node. The IPv6 node (e.g., the mobile router 20a and/or the mobile host 22b) sends via the IPv4 network 14 an IPv6 request, according to HMIPv6, for a regional care-of address that is routable in the IPv6 network 16.

The IPv6 gateway 20b detects via its IPv4 interface the IPv4 packet, and strips off the IPv4 header in response to detecting the prescribed TCP or UDP destination port, described below. The IPv6 gateway 20b, operating as a MAP according to HMIPv6, detects within the recovered IPv6 packet a request for a regional care-of address, and assigns a regional care-of address that is reachable in the IPv6 network 16 via the IPv6 gateway 20b. The IPv6 gateway 20b creates a binding cache entry that associates the regional care-of address with the synthetic tag address, and the IPv4 and TCP or UDP source and destination information from the received IPv4 packet.

Hence, the mobile node (e.g., 20a or 22b) is assigned a regional care-of address while it is roaming within the IPv4 network. The binding cache entry enables the IPv6 gateway 20b to indentify a source of an IPv6 packet based on the IPv4 header information carrying the IPv6 packet, or the synthetic tag address. Hence, the IPv6 gateway 20b can ensure that IPv6 packets from the mobile node 20a or 22b are output onto the IPv6 network 16 with the corresponding assigned regional care-of address, regardless of whether the mobile node specifies the assigned care-of address in the IPv6 source address destination field, or establishes a new IPv4 tunnel (e.g., roaming from the IPv4 network 14a to the IPv4 network 14c).

As described below with respect to FIG. 3, the mobile node (e.g., 20a or 22b) is configured for generating an IPv6 tag address 30 that includes a prescribed protocol identifier 32: the protocol identifier 32 is used by the IPv6 gateway 20b to identify that the IPv6 packet 30, received via the IPv4 network 14, is to be transferred to the IPv6 network 16.

For the sake of simplicity, the following description will reference the mobile router 20a with the understanding that the description applies equally to the mobile host 22b.

Figure 7:
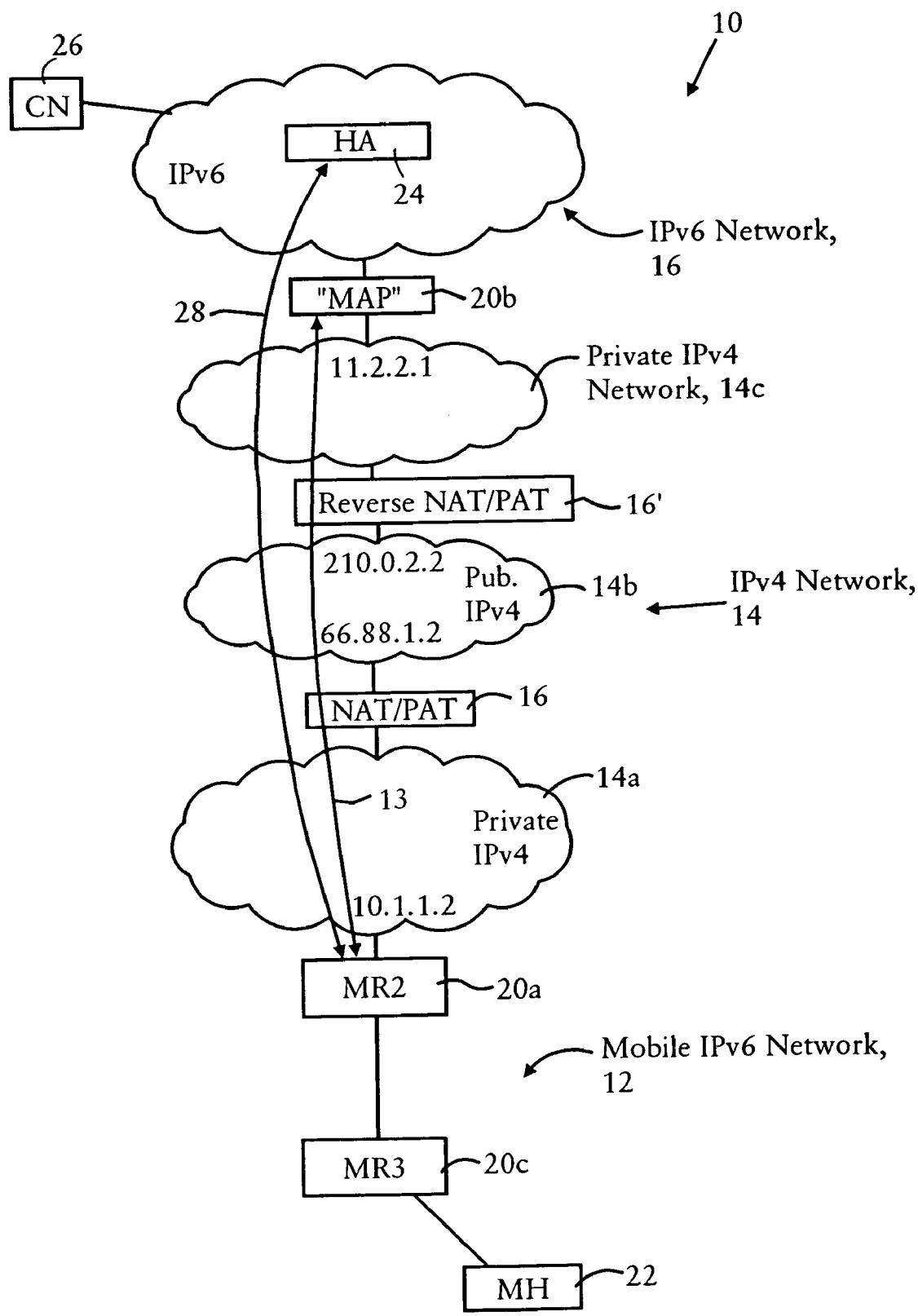
FIG. 7 is a diagram illustrating IPv6 mobile routers establishing an IPv4 connection across an IPv4 network utilizing a network address translator (NAT) and a reverse NAT, according to an alternate embodiment of the present invention.

FIG. 7 is a diagram illustrating a variation of FIG. 1, where the IPv6 gateway 20b is in a private domain of a private IPv4 network 14c instead of the public IPv4 network 14b of FIG. 1. In this case, the NAT 16' at the would own the public address ("210.0.2.2") that is seen as the MAP address by the mobile router 20a. The NAT 16' is preconfigured to 'reverse NAT' all traffic for the TCP or UDP port/public address to the private address ("11.2.2.1") of the MAP 20b. Hence in this case both source IPv4 address 102 and destination IP address 103 (and source TCP or UDP port 104 and destination TCP or UDP port 105) would be stored as part of the binding cache entry by the MAP 20b to ensure the MAP 20b can properly route any IPv6 packet.

Figure 2A:
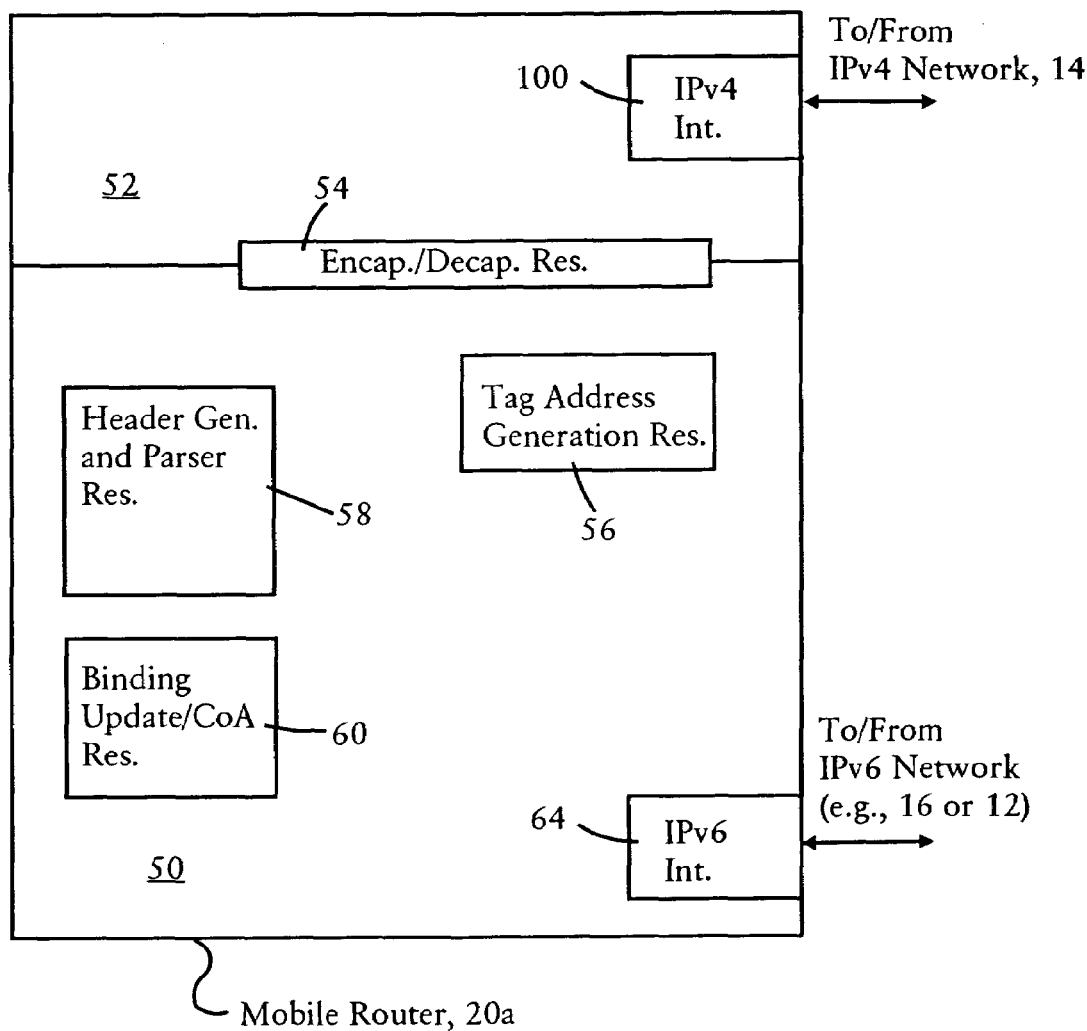
FIGS. 2A and 2B are diagrams illustrating in further detail a IPv6 mobile node and Mobility Anchor Point (MAP)-configured IPv6 router of FIG. 1, respectively, according to an embodiment of the present invention.
Figure 2B:
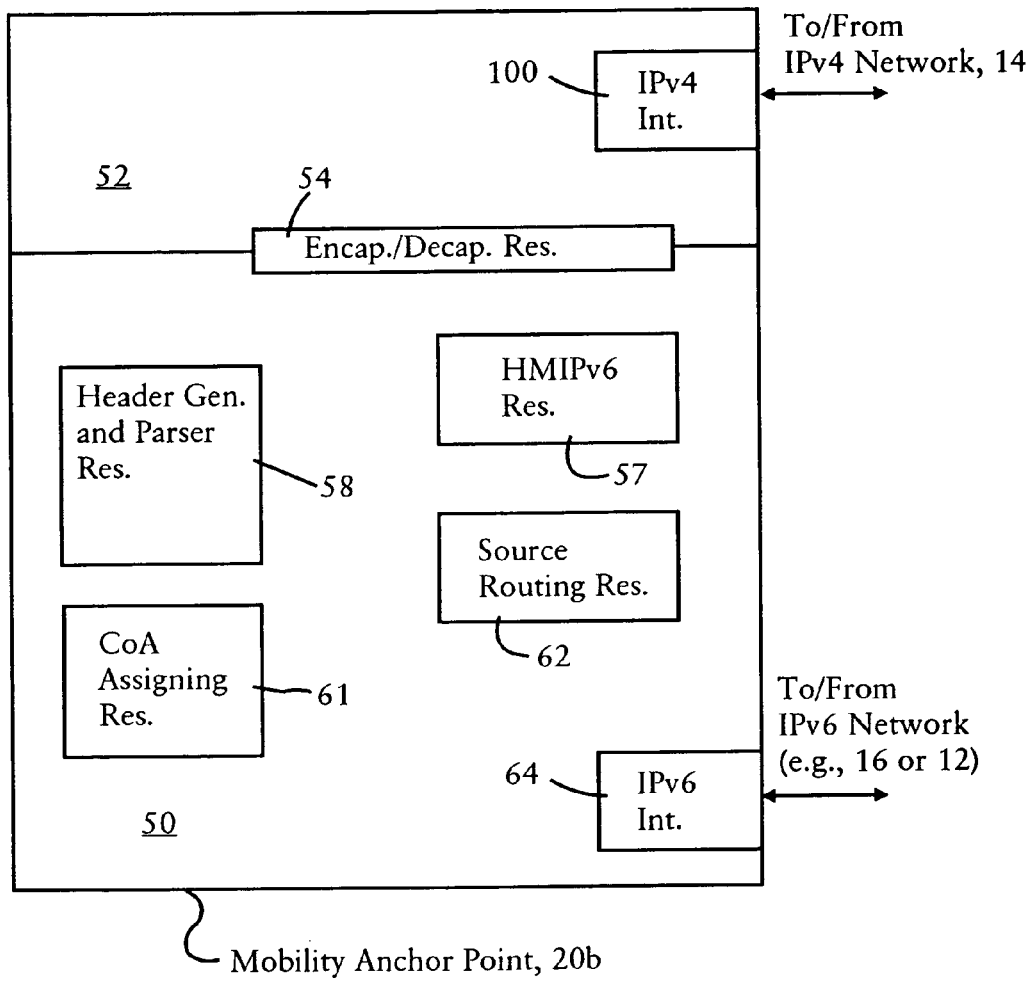

FIG. 2A is a block diagram illustrating a mobile node (e.g., the mobile router 20a) configured for communications with the MAP 20b. As described above, this description of FIG. 2A also is applicable to the mobile host 22b. FIG. 2B is a diagram illustrating the mobility anchor point 20b according to an embodiment of the present invention. The mobile router 20a and the MAP 20b each include an IPv6 portion 50, an IPv4 portion 52, and an encapsulation/decapsulation resource 54.

The IPv6 portion 50 of the mobile router 20a of FIG. 2A includes a tag address generation resource 56, an IPv6 header generation and parser resource 58, a binding update/care-of address requesting resource 60, and an IPv6 interface 64. The IPv6 portion 50 of the mobility anchor point 20b includes a Hierarchical Mobile IPv6 (HMIPv6) Resource 57, the IPv6 header generation and parser resource 58, a care-of address assigning resource 61, a source routing resource 62, and the IPv6 interface 64.

The tag address generation resource 56 of the mobile router 20a is configured for generating the IPv6 tag address 30, illustrated in FIG. 3A, that uniquely identifies the mobile router 20a to the IPv6 gateway 20b. As illustrated in FIG. 3A, the tag address generation resource 56 is configured for generating an IPv6 tag address. 30 that includes a prescribed 32-bit protocol identifier 32 (e.g., "12.34.56.78"), a 32-bit source IPv4 address 34 of the mobile router 20a ("10.1.1.2") a 32-bit public IPv4 gateway address 36 for the IPv6 gateway 20b ("210.0.2.2"), a 16-bit source TCP or UDP port 38 ("0001"), and a prescribed 16-bit public TCP or UDP port 40 ("434") for the IPv6 gateway 20b. The source IPv4 address 34 and the source TCP or UDP address 38 may be private addresses and ports, based on connecting to the private IPv4 network 14a. As described above, the public IPv4 gateway address 36 and the prescribed public TCP or UDP gateway port 40 are known by the mobile router 20a upon attachment to the network 14. If no transport layer header is used in the IPv4 tunnel 13 (e.g,. in the case where the NAT 16 does not include a PAT), then the values 38 and 40 can be set to zero.

Hence, the IPv6 tag address 30 generated by the tag address generation resource 56 provides a unique identifier for use by the MAP in assigning a regional care-of address while the mobile router 20a is roaming within the address realm 14 of the MAP 20b; note that the mobile router 20a may retain the same regional care-of address, even if the mobile router 20a moves between the IPv4 network 14c and the private IPv4 network 14a. Also note that other unique identifiers may be used, for example a randomly-generated 128-bit number or a 128-bit value generated from the node's 48-bit layer 2 (MAC) address.

As shown in FIGS. 2A and 2B, the mobile router 20a and the MAP 20b each include a header generation and parser resource 58 configured for generating an IPv6 header according to mobile IPv6 protocol. The mobile router 20a also includes a binding update/care-of address requestor resource 60 configured for requesting a regional care-of address from the MAP 20b in response to attaching to a network. In particular, in response to establishing an IPv4 tunnel 13 with the MAP 20b, the tag address generation resource 56 generates a unique identifier as an IPv6 tag address 30, and the header generation and parser resource 58 inserts the IPv6 tag address 30 in the source address field 74 of the IPv6 packet 70 that includes within the payload, generated by the care-of address requestor resource 60, a request for a valid IPv6 care-of address.

The MAP 20b includes an HMIPv6 resource 57, and a care-of address assigning resource 61 configured for assigning a valid IPv6 care-of address in response to the request from the mobile host 22b. The HMIPv6 resource 57, in response to detecting within the received IPv6 packet 70 a request for a regional care-of address, sends the request to the care-of address assigning resource 61 for assignment of a valid IPv6 care-of address.

Figure 5:
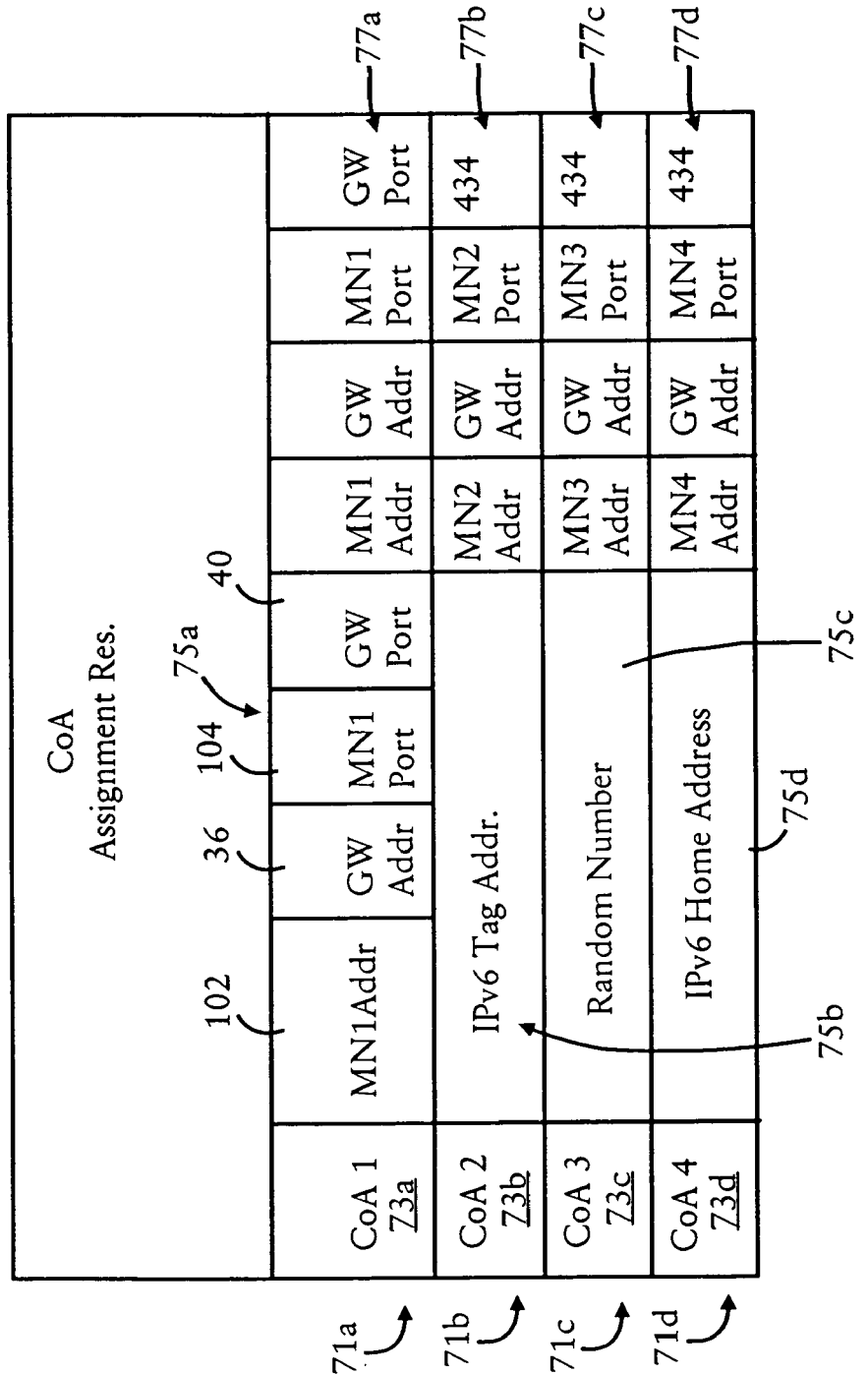
FIG. 5 is a diagram illustrating exemplary binding cache entries that may be maintained by the MAP-configured IPv6 router of FIG. 2B, according to an embodiment of the present invention.

As illustrated in FIG. 5, the care-of address assigning resource 61 includes binding cache entries 71a, 71b, 71c and 71d. Each binding cache entry specifies an assigned care-of address (e.g., 73a, 73b, 73c and 73d), an identifier (e.g., 75a, 75b, 75c, and 75d) for uniquely identifying the corresponding mobile host (e.g., mobile router, mobile host computer) having requested the care-of address, and IPv4 tunnel information (i.e., IPv4 connection state information) 77. As illustrated in FIG. 5, the unique identifer 75a may specify the TCP or UDP tunnel information from a received IPv4 packet (e.g., 90') that includes source address information (e.g., 102) from the IPv4 source address field 92, the destination address information (e.g., 36) from the destination address field 94, the TCP or UDP source port information (e.g., 104) from the TCP or UDP source field 104, and the TCP or UDP destination port information (e.g., 40) from the TCP or UDP destination field 98.

The unique identifier 75b may alternately specify the IPv6 tag address 30 generated by the corresponding mobile host. Alternately the unique identifier 75c may specify a random number generated by the mobile host, or the IPv6 home address 75d of the mobile host. Any one of these unique identifiers 75a, 75b, 75c, and/or 75d may be used based on preference in implementation.

An advantage of storing the unique identifier 75c or 75d that has a value distinct from the IPv4 tunnel is that the care-of address assigning resource 61 can still locate the binding cache entry 71c, using the unique identifier, even if the mobile host moves from one network 14c to another network 14a and needs to establish a new IPv4 tunnel. Typically, however, the care-of address assigning resource 61 will send the assigned care-of address (e.g., 71a) to the mobile host, such that an assigned care-of address can be associated to a new IPv4 tunnel 13 based on detecting the assigned care-of address within the source address field 74 of an IPv6 packet having been received by a newly-established IPv4 tunnel.

Hence, the care-of address assigning resource 61 can assign any value to a care-of address 73 such that each care-of address will include an address prefix having been advertised in the IPv6 network 16 as reachable via the MAP 20b, and a suffix that is assigned by the assigning resource 61. Hence, the suffix may specify information from the identifier fields 75, the IPv4 tunnel fields 77, or alternately may specify a corresponding memory address pointer to the corresponding binding cache entry 71.

In response to receiving a response from the MAP 20b that a care-of address has been assigned, the binding update/care-of address requestor resource 60 of the mobile node having sent the original request sends a binding update message to its corresponding home agent 24. Typically the care-of address would be received by the mobile node, enabling the mobile node to generate security-based keys using the assigned care-of address, and reducing the necessity that the MAP 20b needs to perform source address translation (e.g., tag address to valid care-of address).

In cases where privacy is a concern, or in the case where the MAP 20b does not send the actual care-of address to the mobile node but merely specifies that a care-of address has been assigned, the mobile node can specify the tag address 30 within the IPv6 source address field. In this case, the HMIP resource 57, in response to receiving an IPv6 packet from the the IPv4 network 14 and that specifies a tag address 30 instead of a valid (i.e., routable) IPv6 care-of address, performs an address lookup in the binding cache entries 71; in response to detecting a matching identifier 75 that matches the detected tag address 30, the HMIP resource 57 replaces the IPv6 source address field, specifying the tag address 30, with the valid Care-of Address 73, and outputs the IPv6 packet onto the IPv6 network 16.

The mobile router 20 also includes a source routing resource 62 configured for routing received IPv6 packets having routing headers according to Mobile IPv6 Protocol and reverse routing headers as specified by the Internet Draft by Thubert et al.

FIG. 4 is a diagram illustrating an IPv4 packet 90 encapsulating an IPv6 packet 70, for example a binding update message or a care-of address request message. The message 70 is generated by the header generation and parser resource 58 and the binding update resource/care-of address requestor resource 60. The IPv6 packet 70 includes a source address field 74 specifying the synthetic tag address 30, a destination address field 76, and in this example a destination option 78 specifying the home address (Haddr) of the mobile router

20*a*. The IPv6 packet 70 also includes the payload 88, for example a care-of address request. The source address field 74 specifies the tag address ("TAG") 30 for the mobile router 20*a*, and the destination address field 76 specifies the IPv6 address ("MAP") 80 for the IPv6 gateway 20*b*.

Once the tag address generation resource 56 generates the IPv6 tag address 30 and the header generator 58 generates the IPv6 header for the corresponding payload 88, the encapsulation/decapsulation resource 54 encapsulates the IPv6 packet 70 into an IPv4 packet 90, illustrated in FIG. 4. The IPv4 packet 90 includes an IP header having a source address field 92 specifying the private IPv4 "Care-of Address" (e.g., "10.1.1.2") 34 of the mobile host (e.g., 20*a*), and a destination address field 94 specifying the public IPv4 gateway address (e.g., "210.0.2.2") 36 of the IPv6 gateway 20*b*. The IPv4 packet 90 also includes a transport header 95 that includes a source TCP or UDP port field 96 specifying a source TCP or UDP address ("01") 38, and a destination TCP or UDP port field 98 specifying the prescribed MAP port 40, in this case the known mobile IP port "434". The encapsulation/decapsulation resource 54 of FIG. 2A supplies the IPv4 packet 90 to an IPv4 interface 100 configured for outputting the IPv4 packet 90 onto the IPv4 network (e.g., 14*a*) according to IPv4 protocol.

As illustrated in FIG. 4, the traversal of the IPv4 packet 90 via the NAT 16 from the private network 14*a* to the public network 14*b* causes the NAT/PAT 16 to modify the IPv4 packet 90 into a translated packet 90'. In particular, the NAT/PAT 16 translates the values 34 and 38 in the source address field 92 and the source port field 96 with a public IPv4 address value (e.g., "66.88.1.2") 102 and a public port ("02") 104, respectively. Hence, the IPv6 gateway 20*b* receives the translated packet 90' via the public IPv4 network 14*b*.

As illustrated in FIG. 7, if the IPv6 gateway 20*b* is behind a second NAT/PAT 16', also referred to as the reverse NAT/PAT 16', then the NAT/PAT 16' translates the values 36 and 40 in the destination address field 94 and the destination port field 98 with a private IPv4 address value (e.g,. "11.2.2.1") 103 and a private port ("03") 105, respectively. Hence, the IPv6 gateway 20*b* of FIG. 7 receives the translated packet 90" via the private IPv4 network 14*c*.

The IPv6 gateway 20*b* is configured to recognize itself as being a IPv6 gateway configured for sending IPv6 packets between the IPv6 network 16 and the IPv4 network 14. Hence, the IPv4 interface 100 of the IPv6 gateway 20*b* of FIG. 2B is configured for forwarding the translated packet 90' to the encapsulation/decapsulation resource 54 in response to detecting the prescribed public gateway TCP or UDP port 40 having the value "434" in the destination port field 98.

In the case of FIG. 7 where the IPv6 gateway resides in the private IPv4 network 14*c*, the IPv4 interface 100 may be configured for forwarding the translated packet 90" to the encapsulation/decapsulation resource 54 in response to detecting the prescribed private gateway TCP or UDP port 105 having the value "03" in the destination port field 98. The resource 54 decapsulates the IPv6 packet 70 by stripping off the IPv4 header, and forwarding the IPv6 packet 70 to the IPv6 module 50.

The header generation and parser resource 58 parses the IPv6 header. In response to detecting the protocol identifier 32 in the IPv6 tag address 30 in the source address field 74, or the absence of a valid IPv6 address, the header generation and parser resource 58 issues a function call to the HMIPv6 resource 57. If the HMIPv6 resource 57 detects a request for a new care-of address, the HMIPv6 resource 57 sends the request to the assigning resource 61; if no request is detected, the HMIPv6 resource 57 determines whether an assigned care-of address already exists by using the tag address in the source address field 74 as a key. If no matching assigned care-of address is detected, the packet is dropped.

Assuming the HMIPv6 resource 57 detects a matching entry 71 specifying a corresponding assigned care-of address 73, the HMIPv6 resource 57 inserts the assigned care-of address 73 in the IPv6 source address field 74. The IPv6 interface 64 of the IPv6 gateway 20*b* outputs the modified IPv6 packet (having the valid IPv6 care-of address in the source address field onto the IPv6 network 16.

Assuming the IPv6 packet is a binding update to the home agent 24, the home agent 24 receives the modified IPv6 packet in response to detecting the home agent address value (MR2_HA) 80 in the destination address field 76. The home agent 24 reads Mobile IPv6 home address destination option 78 (i.e., as an index into the binding cache). The home agent 24 can then identify the binding update request 88, and store the regional care-of address for the mobile router 20*a* in its corresponding binding cache entry. Hence, the traversal of the IPv4 network 14 can be transparent to the home agent 24.

The IPv6 gateway 20*b* will have advertised the prefix for the valid IPv6 care-of address on the IPv6 network, using existing routing protocols, indicating that the valid IPv6 care-of address should be routed to the IPv6 gateway 20*b*. Hence, the valid care-of address is routable to the IPv6 gateway 20*b*. Consequently, any packet specifying the valid care-of address in the IPv6 destination address field is routed to the IPv6 gateway 20*b* using existing routing protocols.

The IPv6 gateway 20*b*, in response to receiving an IPv6 packet that specifies the valid care-of address in the IPv6 destination address field, recognizes the valid care-of address as being assigned according to the HMIPv6 protocol by the HMIPv6 resource 57 and the assigning resource 61. The IPv6 gateway 20*b* in response retrieves the IPv4 tunnel information 77 from the binding cache entry 71, and utilizes its encapsulation/decapsulation resource 54 to generate an IPv4 header that specifies the public address 102 and public port 104 of the mobile router 20*a* in the respective destination headers. The IPv4 interface 100 outputs the packet onto the bidirectional tunnel 13.

The IPv4 packet, having been translated by the NAT/PAT 16, specifies the private IP address 34 and the private TCP or UDP port 38 in the destination address and destination port fields, respectively. The mobile router 20*a* can then recover the IPv6 packet 112 based on identifying the source TCP or UDP port specifying the public MAP TCP or UDP value 40.

Figure 6A:
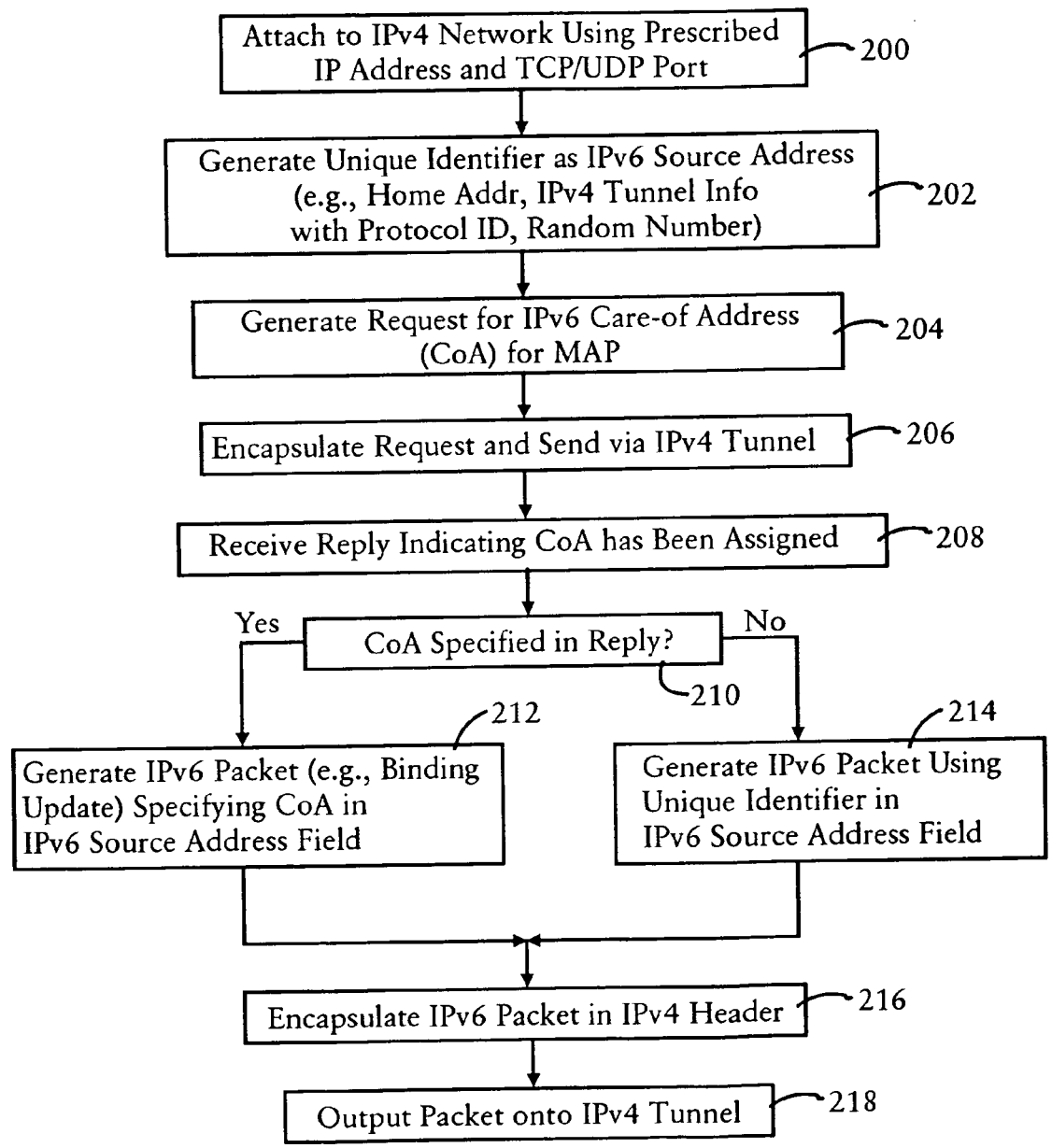
FIGS. 6A, 6B and 6C are flow diagrams summarizing the method of sending IPv6 packets across an IPv4 network, according to an embodiment of the present invention.
Figure 6B:
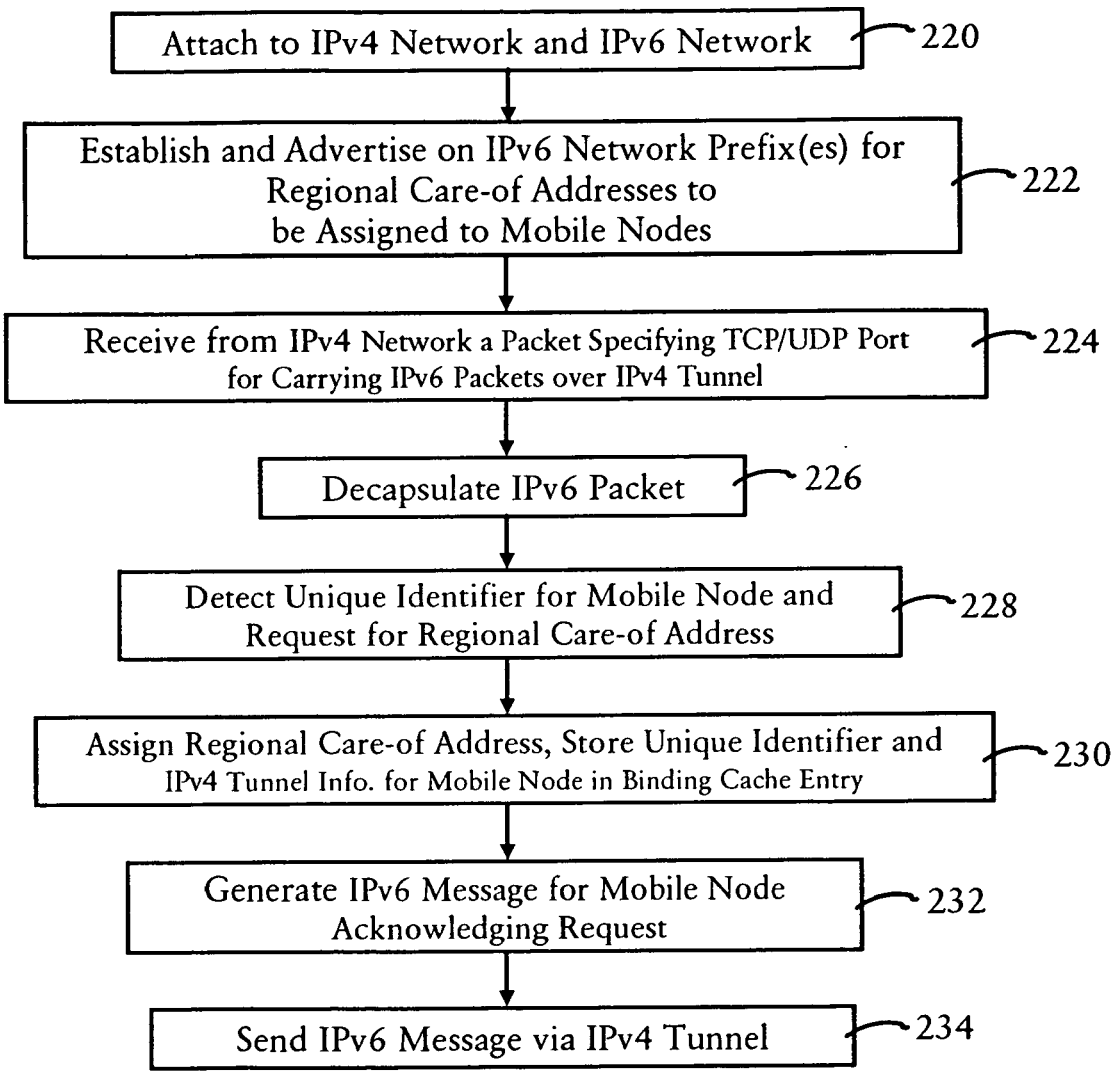
Figure 6C:
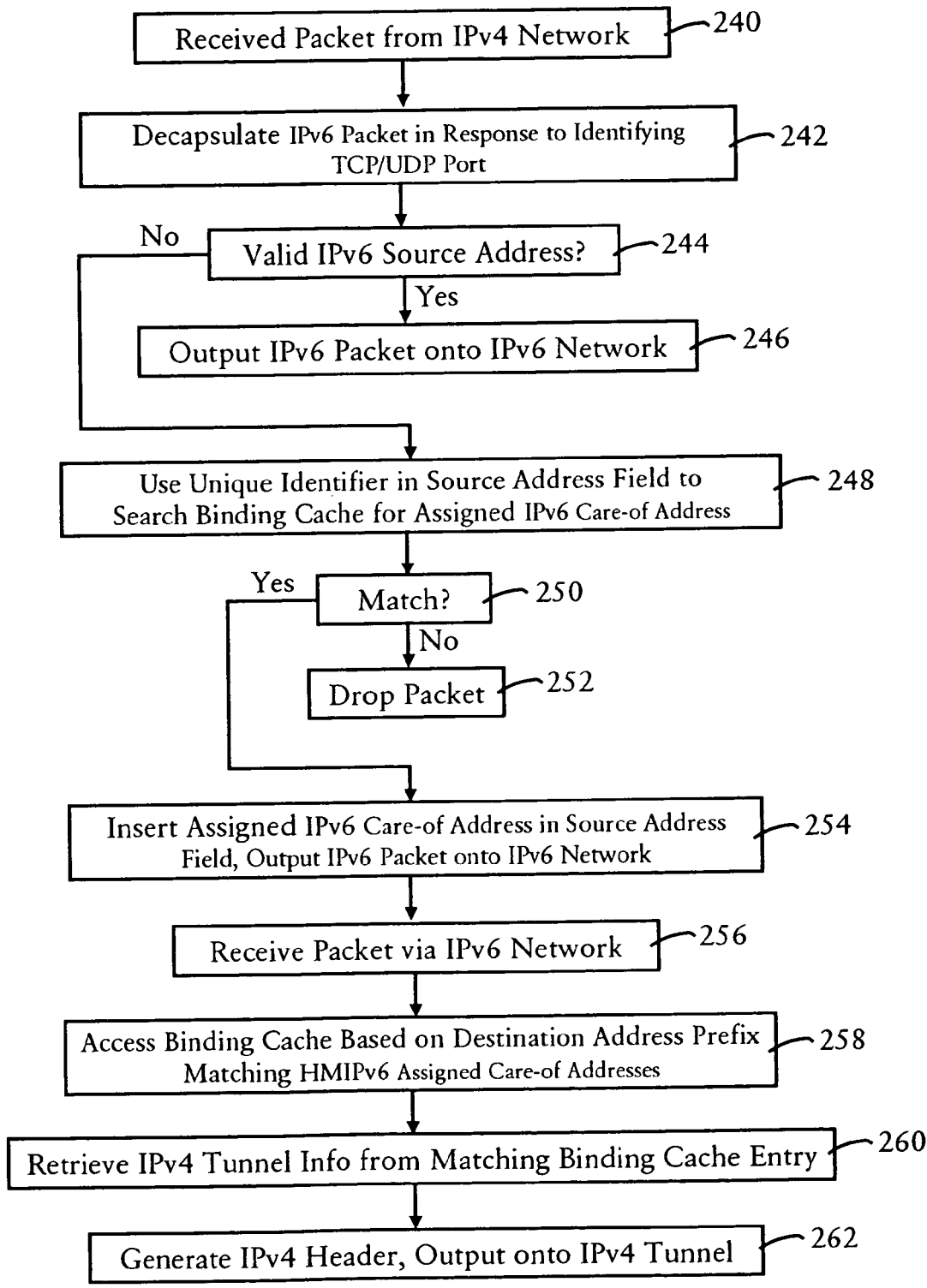

FIGS. 6A, 6B and 6C are diagrams summarizing the method of sending IPv6 packets via an IPv4 tunnel according to an embodiment of the present invention. The steps described herein with respect to FIGS. 6A, 6B and 6C can be implemented in the respective mobile nodes as executable code stored on a computer readable medium (e.g., floppy disk, hard disk, EEPROM, CD-ROM, etc.), or propagated via a computer readable transmission medium (e.g., fiber optic cable, electrically-conductive transmission line medium, wireless electromagnetic medium, etc.).

The method in the mobile node (e.g., 20*a* or 22*b*) begins in step 200, where the IPv4 interface 100 attaches to the IPv4 network 14*a* using its prescribed IP address 34 and TCP or UDP port 38. The tag address generation resource 56 then generates in step 202 a unique identifier for use as an IPv6 source address. As illustrated above with respect to FIG. 3, the unique identifier may be a combination of TCP or UDP tunnel information plus a protocol identifier 32; alternately, as illustrated in FIG. 5, the unique identifier may be a random number generated by the tag address generation resource 56, or the IPv6 home address of the mobile node.

The binding update/care of address requestor resource 60 generates in step 204 a request for a valid IPv6 care of address to be supplied by the mobility anchor point (MAP) 20*b*. As described above, the IPv6 request specifies the unique identifier within the IPv6 source address field. The encapsulation resource 54 encapsulates in step 206 the IPv6 request 70 to form an IPv4 packet 90, as illustrated in FIG. 4, and outputs the IPv4 packet 90 via the IPv4 tunnel 13.

The IPv4 interface 100, in response to receiving in step 208 a packet that specifies the prescribed IPv6 gateway port value "434" in the source port field 104, sends the IPv4 packet to the encapsulation/decapsulation resource 54. The header generation and parser resource 58, in response to detecting in step 208 an IPv6 packet that specifies an acknowledgment by the IPv6 gateway for the valid IPv6 care of address, determines in step 210 whether a valid care of address is specified in the reply.

If in step 210 a valid IPv6 care of address (i.e., an IPv6 address that is reachable in the IPv6 network 16 via the IPv6 gateway 20*b*) is specified in the reply, then the header generation and parser resource 58 generates in step 212 IPv6 packets that specify the assigned care of address in the IPv6 source address field 74. However if in step 210 a valid IPv6 care of address is not specified within the reply, for example due to security considerations by the IPv6 gateway 20*b*, the header generation and parser resource 58 generates in step 214 IPv6 packets that specify the unique identifier 30 in the IPv6 source address field 74. As described below with respect to FIG. 6B, the IPv6 gateway 20*b* substitutes the unique identifier in the source address field 74 with the assigned care of address prior to outputting the IPv6 packet onto the IPv6 network 16.

The generated IPv6 packet is encapsulated in step 216 with an IPv4 header by the encapsulation/decapsulation resource 54, and the IPv4 packet 90 is output onto the IPv4 tunnel 13 in step 218.

Referring to FIG. 6B, the IPv6 gateway 20*b*, configured for operating according to HMIPv6 protocol, attaches in step 220 to the IPv4 network 14 and the IPv6 network 16. The IPv6 gateway 20*b* establishes in step 222 a range of regional care of addresses to be assigned to mobile nodes, and advertises the relevant address prefix(es) on the IPv6 network 16 using existing IPv6 routing protocols.

The IPv6 gateway 20*b* receives in step 224 an IPv4 packet from the IPv4 network 14*b* that specifies the TCP or UDP port 40 ("434") for carrying IPv6 packets over an IPv4 tunnel 13. In response to detecting the prescribed TCP or UDP port in the destination TCP or UDP port fields, the decapsulation resource 54 of the IPv6 gateway 20*b* decapsulates in step 226 the IPv6 packet.

The HMIPv6 resource 57 detects in step 228 the unique identifier for the mobile node, in the request for a regional care of address. The care of address assigning resource 61 assigns in step 230 a regional care of address (e.g., 73*b*), and stores the corresponding binding cache entry 71*b* with the unique identifier 75*b* and the tunnel information 77, including the IPv4 address and TCP or UDP port of the mobile host, and the IPv4 address and TCP or UDP port of the IPv6 gateway. The HMIPv6 resource 57 generates in step 232 an IPv6 message that acknowledges the request, and sends in step 234 the IPv6 message acknowledging the request via the IPv4 tunnel 13. As described above, the IPv6 message output in step 234 may optionally include the assigned care of address.

FIG. 6C illustrates routing by the IPv6 gateway 20*b*. The IPv6 gateway 20*b* receives in step 240 a packet from the IPv4 network 14*b*. The encapsulation/decapsulation resource 54 decapsulates in step 242 the IPv6 packet 70 in response to identifying the TCP or UDP port value 40 ("434") for transporting IPv6 packets over an IPv4 connection. If in step 244 the HMIPv6 resource 57 detects a valid IPv6 source address, the IPv6 interface 64 outputs in step 246 the IPv6 packet onto the IPv6 network 16.

If in step 244 the HMIPv6 resource 57 does not detect a valid IPv6 address in the IPv6 source address field, the HMIPv6 resource 57 uses the unique identifier in the source address field to search in step 248 for a binding cache entry 71 having an assigned care of address 73 matching the unique identifier specified in the IPv6 source address field. If in step 250 no match is found for the unique identifier in the binding cache entries 71, the packet is dropped in step 252.

If in step 250 a matching unique identifier 75 is located, the corresponding assigned IPv6 care of address 73 is inserted in step 254 into the IPv6 source address field, and the modified IPv6 packet is output onto the IPv6 network 16.

The IPv6 gateway 20*b* also is configured for accessing the binding cache entries for IPv6 packets received in step 256 from the IPv6 network 16. In particular, if the IPv6 destination address has a prefix that matches the HMIPv6 assigned care of addresses, the HMIPv6 resource 57 accesses the binding cache entries 71 in step 258 to determine a matching IPv6 destination address. The HMIPv6 resource 57 retrieves in step 260 the IPv4 tunnel information 77 from the matching entry 71. The encapsulation resource 54 generates in step 262 the IPv4 header using the tunnel information 77 from the matching entry 71, enabling the IPv4 interface 100 to output the encapsulated IPv6 packet onto the IPv4 tunnel 13.

According to the disclosed embodiment, IPv6 mobile nodes can efficiently establish tunnels across an IPv4 network for transfer of IPv6 packets, regardless of whether the IPv4 network utilizes symmetric NATs. The IPv4 tunnel is always started by the mobile node sending the binding update: hence, the IPv4 tunnel is always available because the mobile node knows that it has its own tunnel at any point in time. If the binding update is sent often enough for the resource to maintain the path, then the path will remain active simply by default execution of Mobile IP protocol by the mobile node. Hence, the IPv4 tunnel is always active with no extra processing resource cost.

In addition, the use of assigned care-of addresses eliminates the necessity that a home agent is co-located with the IPv6 gateway. Further, assignment of care-of addresses the IPv6 gateway enables a mobile node to roam throughout IPv4 networks without needing to disclose its whereabouts to the home agent or other correspondent nodes in the IPv6 network.

Finally, the disclosed arrangement eliminates the necessity of a reverse routing header, enabling the tunneling over the IPv4 network to be implemented between an IPv6 mobile node (e.g., mobile host computer) and an IPv6 router that does not have Mobile IP capabilities. As such, the forwarding of packets via the IPv4 network is transparent to the IPv6 interfaces of the IPv4 endpoints.

While the disclosed embodiment has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A method in an IPv6 mobile node, the method including:

first generating a tag that uniquely identifies the IPv6 mobile node to an IPv6 gateway having an IPv4 gateway address and an IPv6 gateway address, the IPv6 gateway configured for transferring packets between an IPv4 network via the corresponding IPv4 gateway address and an IPv6 network;

second generating a first IPv6 packet that specifies a request for a valid IPv6 care-of address that is reachable in the IPv6 network via the IPv6 gateway, the first IPv6 packet having an IPv6 source address field that specifies the tag and an IPv6 destination address field that specifies the IPv6 gateway address;

first encapsulating the first IPv6 packet in a first IPv4 packet having an IPv4 header including a destination address field that specifies the IPv4 gateway address, a source address field specifying a mobile node IPv4 address for the IPv6 mobile node, and a transport header having a source port field specifying a prescribed transport layer port for the IPv6 mobile node, and a destination port field specifying a prescribed transport layer port for the IPv6 gateway used for identifying transfer of the IPv6 packet between the IPv4 network and the IPv6 network;

first outputting the first IPv4 packet carrying the first IPv6 packet to the IPv6 gateway via the IPv4 network;

receiving a second IPv4 packet carrying a second IPv6 packet that indicates an acknowledgement by the IPv6 gateway for the valid IPv6 care-of address;

third generating a third IPv6 packet for a destination node reachable via the IPv6 network;

second encapsulating the third IPv6 packet in a third IPv4 packet having the IPv4 header; and second outputting the third IPv4 packet onto the IPv4 network for transfer of the third IPv6 packet onto the IPv6 network by the IPv6 gateway.

2. The method of claim 1, wherein the first generating step includes specifying within the tag the mobile node IPv4 address, the prescribed transport layer port for the IPv6 mobile node, the IPv4 gateway address, and the prescribed transport layer port for the IPv6 gateway.

3. The method of claim 2, wherein the third generating step further includes specifying within the tag a prescribed protocol identifier recognizable by the IPv6 gateway as specifying insertion of the valid IPv6 care-of address in the corresponding IPv6 source address field prior to outputting the corresponding IPv6 packet onto the IPv6 network.

4. The method of claim 3, wherein the third generating step includes inserting the tag within the IPv6 source address field of the third IPv6 packet.

5. The method of claim 2, wherein the receiving step includes obtaining the valid IPv6 care-of address from the second IPv6 packet.

6. The method of claim 5, wherein the third generating step includes inserting the valid IPv6 care-of address in the IPv6 source address field of the third IPv6 packet.

7. The method of claim 1, wherein the mobile node IPv4 address is a private IPv4 address, the prescribed transport layer port for the IPv6 mobile node is a private TCP port, the IPv4 gateway is a public IPv4 address, and the prescribed transport layer port for the IPv6 gateway is a public TCP port.

8. A method in an IPv6 router, the method including:

attaching to an IPv4 network using an IPv4 gateway address and an IPv6 network using an IPv6 address;

receiving from the IPv4 network a first IPv4 packet having a destination address field specifying the IPv4 gateway address, a destination port field specifying a prescribed transport layer gateway port, a source address field specifying an IPv4 address and a source port field specifying a second transport layer port;

recovering an IPv6 packet from the IPv4 packet in response to detecting the prescribed transport layer gateway port in the destination port field;

detecting within the IPv6 packet an IPv6 source address field that specifies an IPv6 tag address that uniquely identifies an IPv6 mobile node, and a request for a valid IPv6 care-of address that is reachable in the IPv6 network via the IPv6 router;

assigning the valid IPv6 care-of address in response to the request; and outputting via the IPv4 network a second IPv4 packet, the second IPv4 packet carrying a second IPv6 packet generated by the IPv6 router in response to the assigning step and that acknowledges the request for the valid IPv6 care-of address, the second IPv4 packet specifying the IPv4 address of the IPv6 mobile node in the corresponding destination address field and the second transport layer port in the corresponding destination port field.

9. The method of claim 8, wherein the assigning includes generating a binding entry that associates the valid IPv6 care-of address with at least a prescribed portion of the IPv6 tag address that uniquely identifies the IPv6 mobile node.

10. The method of claim 9, wherein the prescribed portion of the IPv6 tag address includes a second IPv4 address used by the IPv6 mobile node as a source address for identifying the IPv6 mobile node, a third IPv4 address used by the IPv6 mobile node as a destination address for identifying the IPv6 router, a third transport layer port value used as a source port by the IPv6 mobile node in establishing an IPv4 connection with the IPv6 router, and a fourth transport layer port value used by the IPv6 mobile node as a destination port for identifying the IPv6 router via the IPv4 connection.

11. The method of claim 10, wherein the second IPv4 address and the third transport layer port specified in the IPv6 tag address are private values and the IPv4 address and the second transport layer port are public values, the generating further including associating within the binding entry the IPv4 address and the second transport layer port.

12. The method of claim 8, wherein the outputting step includes inserting within the second IPv6 packet the valid IPv6 care-of address for use by the IPv6 mobile node.

13. The method of claim 9, further comprising:

receiving from the IPv4 network a third IPv4 packet having a destination address field specifying the IPv4 gateway address, and a destination port field specifying the prescribed transport layer gateway port;

recovering a third IPv6 packet from the IPv4 packet, in response to detecting the prescribed transport layer gateway port in the destination port field, that specifies the IPv6 tag address in the corresponding IPv6 source address field and a valid IPv6 address in a corresponding IPv6 destination address field;

accessing the binding entry in response to detecting that the IPv6 tag address is not a valid IPv6 address, and retrieving the valid IPv6 care-of address from the binding entry based on detecting a match between the IPv6 tag address in the corresponding IPv6 source address field of the third IPv6 packet and the corresponding at least a prescribed portion of the IPv6 tag address;

outputting the third IPv6 packet, after having overwritten the valid IPv6 care-of address into the corresponding IPv6 source address field, onto the IPv6 network.

14. The method of claim 8, wherein the assigning step includes generating a binding entry that associates the valid IPv6 care-of address with at least one of at least a prescribed portion of the IPv6 tag address that uniquely identifies the IPv6 mobile node, and IPv4 connection state information including the IPv4 gateway address, a first TCP port as the prescribed transport layer gateway port, the IPv4 address and a second TCP port as the second transport layer port.

15. The method of claim 14, further comprising:

receiving a third IPv6 packet from the IPv6 network and that has a corresponding IPv6 destination address field that specifies the valid IPv6 care-of address;

retrieving the IPv4 connection state information from the binding entry based on the valid IPv6 care-of address specified in the IPv6 destination address field of the third IPv6 packet;

encapsulating the third IPv6 packet in a third IPv4 packet that specifies the IPv4 connection state information, including specifying the IPv4 address and the second transport layer port in the corresponding destination address field and the corresponding destination port field, respectively; and outputting the third IPv4 packet onto the IPv4 network.

16. An IPv6 mobile node comprising:

first means for generating a tag that uniquely identifies the IPv6 mobile node to an IPv6 gateway having an IPv4 gateway address and an IPv6 gateway address, the IPv6 gateway configured for transferring packets between an IPv4 network via the corresponding IPv4 gateway address and an IPv6 network;

second means for generating a first IPv6 packet that specifies a request for a valid IPv6 care-of address that is reachable in the IPv6 network via the IPv6 gateway, the first IPv6 packet having an IPv6 source address field that specifies the tag and an IPv6 destination address field that specifies the IPv6 gateway address;

means for encapsulating the first IPv6 packet in a first IPv4 packet having an IPv4 header including a destination address field that specifies the IPv4 gateway address, a source address field specifying a mobile node IPv4 address for the IPv6 mobile node, and a transport header having a source port field specifying a prescribed transport layer port for the IPv6 mobile node, and a destination port field specifying a prescribed transport layer port for the IPv6 gateway used for identifying transfer of the IPv6 packet between the IPv4 network and the IPv6 network;

means for outputting the first IPv4 packet carrying the first IPv6 packet to the IPv6 gateway via the IPv4 network, the outputting means configured for receiving a second IPv4 packet carrying a second IPv6 packet that indicates an acknowledgement by the IPv6 gateway for the valid IPv6 care-of address;

the second means configured for generating a third Pv6 packet for a destination node reachable via the IPv6 network;

the encapsulating means configured for encapsulating the third IPv6 packet in a third IPv4 packet having the IPv4 header; and the outputting means configured for outputting the third IPv4 packet onto the IPv4 network for transfer of the third IPv6 packet onto the IPv6 network by the IPv6 gateway.

17. The node of claim 16, wherein the first means is configured for specifying within the tag the mobile node IPv4 address, the prescribed transport layer port for the IPv6 mobile node, the IPv4 gateway address, and the prescribed transport layer port for the IPv6 gateway.

18. The node of claim 17, wherein first means is configured for specifying within the tag a prescribed protocol identifier recognizable by the IPv6 gateway as specifying insertion of the valid IPv6 care-of address in the corresponding IPv6 source address field prior to outputting the corresponding IPv6 packet onto the IPv6 network.

19. The node of claim 18, wherein the second means is configured for inserting the tag within the IPv6 source address field of the third IPv6 packet.

20. The node of claim 17, wherein the outputting means is configured for obtaining the valid IPv6 care-of address from the second IPv6 packet.

21. The node of claim 20, wherein the second means is configured for inserting the valid IPv6 care-of address in the IPv6 source address field of the third IPv6 packet.

22. The node of claim 16, wherein the mobile node IPv4 address is a private IPv4 address, the prescribed transport layer port for the IPv6 mobile node is a private TCP port, the IPv4 gateway is a public IPv4 address, and the prescribed transport layer port for the IPv6 gateway is a public TCP port.

23. An IPv6 router including:

means for connecting to an IPv4 network using an IPv4 gateway address and an IPv6 network using an IPv6 address, the connecting means configured for receiving from the IPv4 network a first IPv4 packet having a destination address field specifying the IPv4 gateway address, a destination port field specifying a prescribed transport layer gateway port, a source address field specifying an IPv4 address and a source port field specifying a second transport layer port;

means for recovering an IPv6 packet from the IPv4 packet in response to detecting the prescribed transport layer gateway port in the destination port field;

means for detecting within the IPv6 packet an IPv6 source address field that specifies an IPv6 tag address that uniquely identifies an IPv6 mobile node, and a request for a valid IPv6 care-of address that is reachable in the IPv6 network via the IPv6 router;

means for assigning the valid IPv6 care-of address in response to the request;

the connecting means configured for outputting via the IPv4 network a second IPv4 packet, the second IPv4 packet carrying a second IPv6 packet generated by the IPv6 router and that acknowledges the request for the valid IPv6 care-of address, the second IPv4 packet specifying the IPv4 address of the IPv6 mobile node in the corresponding destination address field and the second transport layer port in the corresponding destination port field.

24. The router of claim 23, wherein the assigning means is configured for generating a binding entry that associates the valid IPv6 care-of address with at least a prescribed portion of the IPv6 tag address that uniquely identifies the IPv6 mobile node.

25. The router of claim 24, wherein the prescribed portion of the IPv6 tag address includes a second IPv4 address used by the IPv6 mobile node as a source address for identifying the IPv6 mobile node, a third IPv4 address used by the IPv6 mobile node as a destination address for identifying the IPv6 router, a third transport layer port value used as a source port by the IPv6 mobile node in establishing an IPv4 connection with the IPv6 router, and a fourth transport layer port value used by the IPv6 mobile node as a destination port for identifying the IPv6 router via the IPv4 connection.

26. The router of claim 25, wherein the second IPv4 address and the third transport layer port specified in the IPv6 tag address are private values and the IPv4 address and the second transport layer port are public values, the assigning means configured for associating within the binding entry the IPv4 address and the second transport layer port.

27. The router of claim 23, wherein the connecting means configured for inserting within the second IPv6 packet the valid IPv6 care-of address for use by the IPv6 mobile node.

28. The router of claim 24, wherein:
the connecting means is configured for receiving from the IPv4 network a third IPv4 packet having a destination address field specifying the IPv4 gateway address, and a destination port field specifying the prescribed transport layer gateway port;
the recovering means is configured for recovering a third IPv6 packet from the IPv4 packet, in response to detecting the prescribed transport layer gateway port in the destination port field, that specifies the IPv6 tag address in the corresponding IPv6 source address field and a valid IPv6 address in a corresponding IPv6 destination address field;
the connecting means is configured for accessing the binding entry in response to detecting that the IPv6 tag address is not a valid IPv6 address, and retrieving the valid IPv6 care-of address from the binding entry based on detecting a match between the IPv6 tag address in the corresponding IPv6 source address field of the third IPv6 packet and the corresponding at least a prescribed portion of the IPv6 tag address;
the connecting means configured for outputting the third IPv6 packet, after having overwritten the valid IPv6 care-of address into the corresponding IPv6 source address field, onto the IPv6 network.

29. The router of claim 23, wherein the assigning means is configured for generating a binding entry that associates the valid IPv6 care-of address with at least one of at least a prescribed portion of the IPv6 tag address that uniquely identifies the IPv6 mobile node, and IPv4 connection state information including the IPv4 gateway address, a first TCP port as the prescribed transport layer gateway port, the IPv4 address and a second TCP port as the second transport layer port.

30. The router of claim 29, wherein:
the connecting means is configured for receiving a third IPv6 packet from the IPv6 network and that has a corresponding IPv6 destination address field that specifies the valid IPv6 care-of address;
the connecting means including means for retrieving the IPv4 connection state information from the binding entry based on the valid IPv6 care-of address specified in the IPv6 destination address field of the third IPv6 packet;
the connecting means including means for encapsulating the third IPv6 packet in a third IPv4 packet that specifies the IPv4 connection state information, including specifying the IPv4 address and the second transport layer port in the corresponding destination address field and the corresponding destination port field, respectively;
the connecting means outputting the third IPv4 packet onto the IPv4 network.

31. A computer readable medium having stored thereon sequences of instructions for outputting an IPv4 packet by an IPv6 mobile node, the sequences of instructions including instructions for:
first generating a tag that uniquely identifies the IPv6 mobile node to an IPv6 gateway having an IPv4 gateway address and an IPv6 gateway address, the IPv6 gateway configured for transferring packets between an IPv4 network via the corresponding IPv4 gateway address and an IPv6 network;
second generating a first IPv6 packet that specifies a request for a valid IPv6 care-of address that is reachable in the IPv6 network via the IPv6 gateway, the first IPv6 packet having an IPv6 source address field that specifies the tag and an IPv6 destination address field that specifies the IPv6 gateway address;
first encapsulating the first IPv6 packet in a first IPv4 packet having an IPv4 header including a destination address field that specifies the IPv4 gateway address, a source address field specifying a mobile node IPv4 address for the IPv6 mobile node, and a transport header having a source port field specifying a prescribed transport layer port for the IPv6 mobile node, and a destination port field specifying a prescribed transport layer port for the IPv6 gateway used for identifying transfer of the IPv6 packet between the IPv4 network and the IPv6 network;
first outputting the first IPv4 packet carrying the first IPv6 packet to the IPv6 gateway via the IPv4 network;
receiving a second IPv4 packet carrying a second IPv6 packet that indicates an acknowledgement by the IPv6 gateway for the valid IPv6 care-of address;
third generating a third IPv6 packet for a destination node reachable via the IPv6 network;
second encapsulating the third IPv6 packet in a third IPv4 packet having the IPv4 header; and
second outputting the third IPv4 packet onto the IPv4 network for transfer of the third IPv6 packet onto the IPv6 network by the IPv6 gateway.

32. The medium of claim 31, wherein the first generating step includes specifying within the tag the mobile node IPv4 address, the prescribed transport layer port for the IPv6 mobile node, the IPv4 gateway address, and the prescribed transport layer port for the IPv6 gateway.

33. The medium of claim 32, wherein the third generating step further includes specifying within the tag a prescribed protocol identifier recognizable by the IPv6 gateway as specifying insertion of the valid IPv6 care-of address in the corresponding IPv6 source address field prior to outputting the corresponding IPv6 packet onto the IPv6 network.

34. The medium of claim 33, wherein the third generating step includes inserting the tag within the IPv6 source address field of the third IPv6 packet.

35. The medium of claim 32, wherein the receiving step includes obtaining the valid IPv6 care-of address from the second IPv6 packet.

36. The medium of claim 35, wherein the third generating step includes inserting the valid IPv6 care-of address in the IPv6 source address field of the third IPv6 packet.

37. The medium of claim 31, wherein the mobile node IPv4 address is a private IPv4 address, the prescribed transport layer port for the IPv6 mobile node is a private TCP port, the IPv4 gateway is a public IPv4 address, and the prescribed transport layer port for the IPv6 gateway is a public TCP port.

38. A computer readable medium having stored thereon sequences of instructions for outputting an IPv4 packet by an IPv6 router, the sequences of instructions including instructions for:

attaching to an IPv4 network using an IPv4 gateway address and an IPv6 network using an IPv6 address;

receiving from the IPv4 network a first IPv4 packet having a destination address field specifying the IPv4 gateway address, a destination port field specifying a prescribed transport layer gateway port, a source address field specifying an IPv4 address and a source port field specifying a second transport layer port;

recovering an IPv6 packet from the IPv4 packet in response to detecting the prescribed transport layer gateway port in the destination port field;

detecting within the IPv6 packet an IPv6 source address field that specifies an IPv6 tag address that uniquely identifies an IPv6 mobile node, and a request for a valid IPv6 care-of address that is reachable in the IPv6 network via the IPv6 router;

assigning the valid IPv6 care-of address in response to the request; and outputting via the IPv4 network a second IPv4 packet, the second IPv4 packet carrying a second IPv6 packet generated by the IPv6 router in response to the assigning step and that acknowledges the request for the valid IPv6 care-of address, the second IPv4 packet specifying the IPv4 address of the IPv6 mobile node in the corresponding destination address field and the second transport layer port in the corresponding destination port field.

39. The medium of claim 38, wherein the assigning includes generating a binding entry that associates the valid IPv6 care-of address with at least a prescribed portion of the IPv6 tag address that uniquely identifies the IPv6 mobile node.

40. The medium of claim 39, wherein the prescribed portion of the IPv6 tag address includes a second IPv4 address used by the IPv6 mobile node as a source address for identifying the IPv6 mobile node, a third IPv4 address used by the IPv6 mobile node as a destination address for identifying the IPv6 router, a third transport layer port value used as a source port by the IPv6 mobile node in establishing an IPv4 connection with the IPv6 router, and a fourth transport layer port value used by the IPv6 mobile node as a destination port for identifying the IPv6 router via the IPv4 connection.

41. The medium of claim 40, wherein the second IPv4 address and the and the second transport layer port are public values, the generating further including associating within the binding entry the IPv4 address and the second transport layer port.

42. The medium of claim 38, wherein the outputting step includes inserting within the second IPv6 packet the valid IPv6 care-of address for use by the IPv6 mobile node.

43. The medium of claim 39, further comprising instructions for:

receiving from the IPv4 network a third IPv4 packet having a destination address field specifying the IPv4 gateway address, and a destination port field specifying the prescribed transport layer gateway port;

recovering a third IPv6 packet from the IPv4 packet, in response to detecting the prescribed transport layer gateway port in the destination port field, that specifies the IPv6 tag address in the corresponding IPv6 source address field and a valid IPv6 address in a corresponding IPv6 destination address field;

accessing the binding entry in response to detecting that the IPv6 tag address is not a valid IPv6 address, and retrieving the valid IPv6 care-of address from the binding entry based on detecting a match between the IPv6 tag address in the corresponding IPv6 source address field of the third IPv6 packet and the corresponding at least a prescribed portion of the IPv6 tag address;

outputting the third IPv6 packet, after having overwritten the valid IPv6 care-of address into the corresponding IPv6 source address field, onto the IPv6 network.

44. The medium of claim 38, wherein the assigning step includes generating a binding entry that associates the valid IPv6 care-of address with at least one of at least a prescribed portion of the IPv6 tag address that uniquely identifies the IPv6 mobile node, and IPv4 connection state information including the IPv4 gateway address, a first TCP port as the prescribed transport layer gateway port, the IPv4 address and a second TCP port as the second transport layer port.

45. The medium of claim 44, further comprising instructions for:

receiving a third IPv6 packet from the IPv6 network and that has a corresponding IPv6 destination address field that specifies the valid IPv6 care-of address;

retrieving the IPv4 connection state information from the binding entry based on the valid IPv6 care-of address specified in the IPv6 destination address field of the third IPv6 packet;

encapsulating the third IPv6 packet in a third IPv4 packet that specifies the IPv4 connection state information, including specifying the IPv4 address and the second transport layer port in the corresponding destination address field and the corresponding destination port field, respectively; and outputting the third IPv4 packet onto the IPv4 network.

\* \* \* \* \*